Aug. 13, 1946.                N. C. PRICE                2,405,670
              PRESSURIZING EQUIPMENT FOR AIRCRAFT
                   Filed Aug. 17, 1942            5 Sheets-Sheet 1
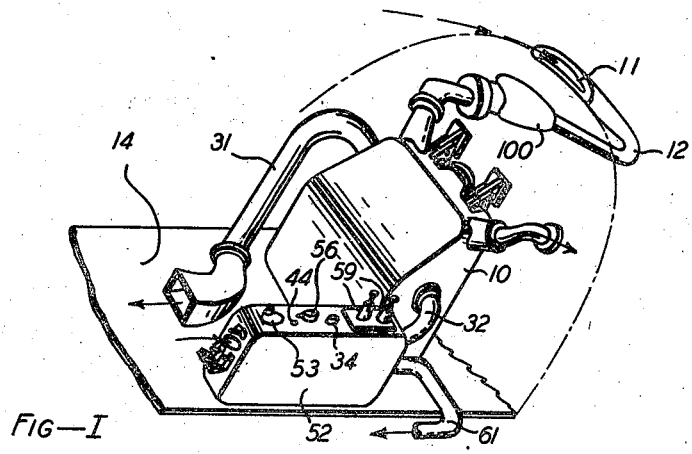
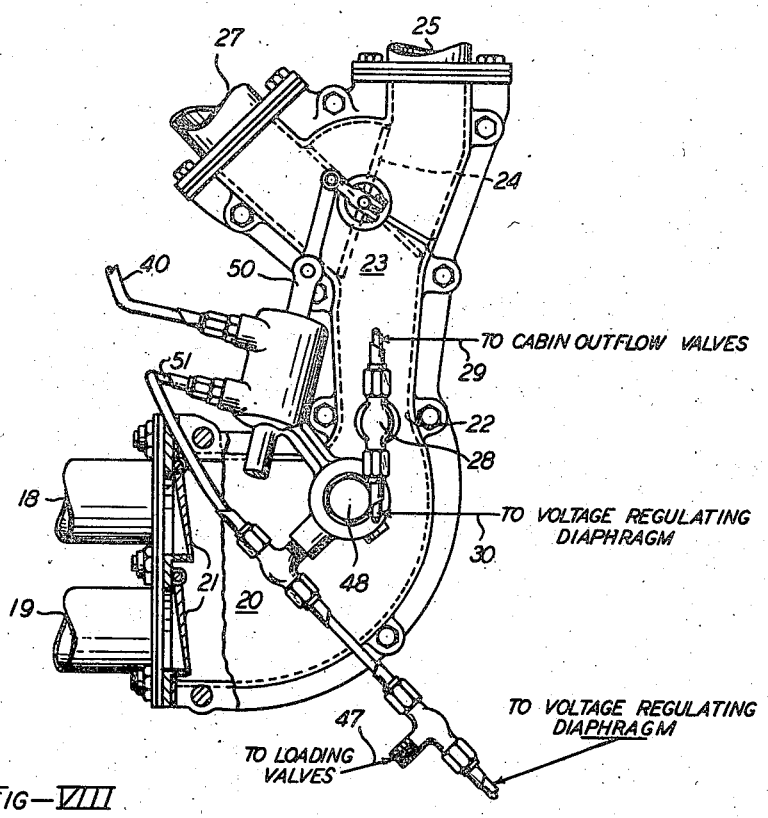
INVENTOR
NATHAN C. PRICE
BY George C. Sullivan

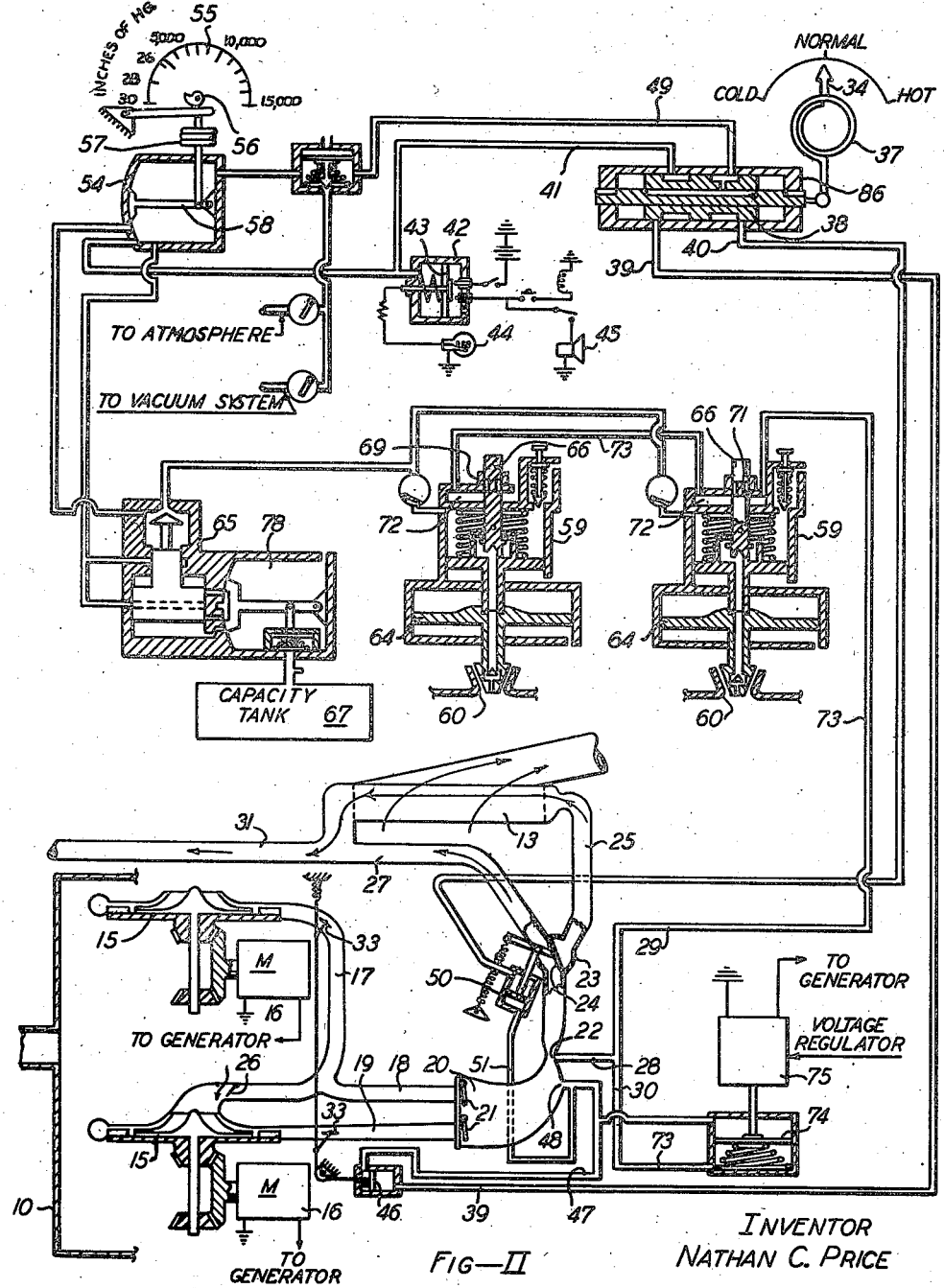

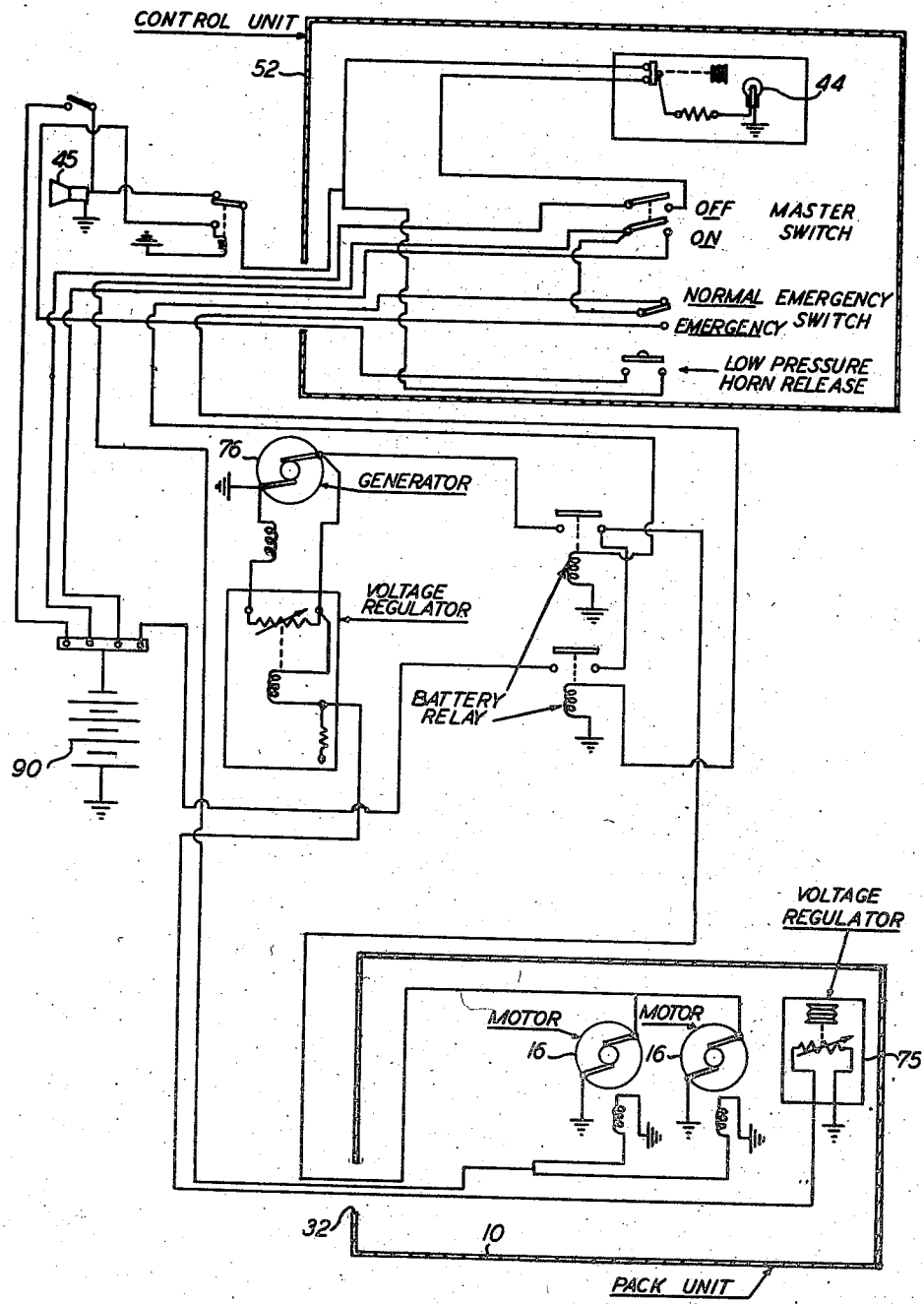
FIG—III

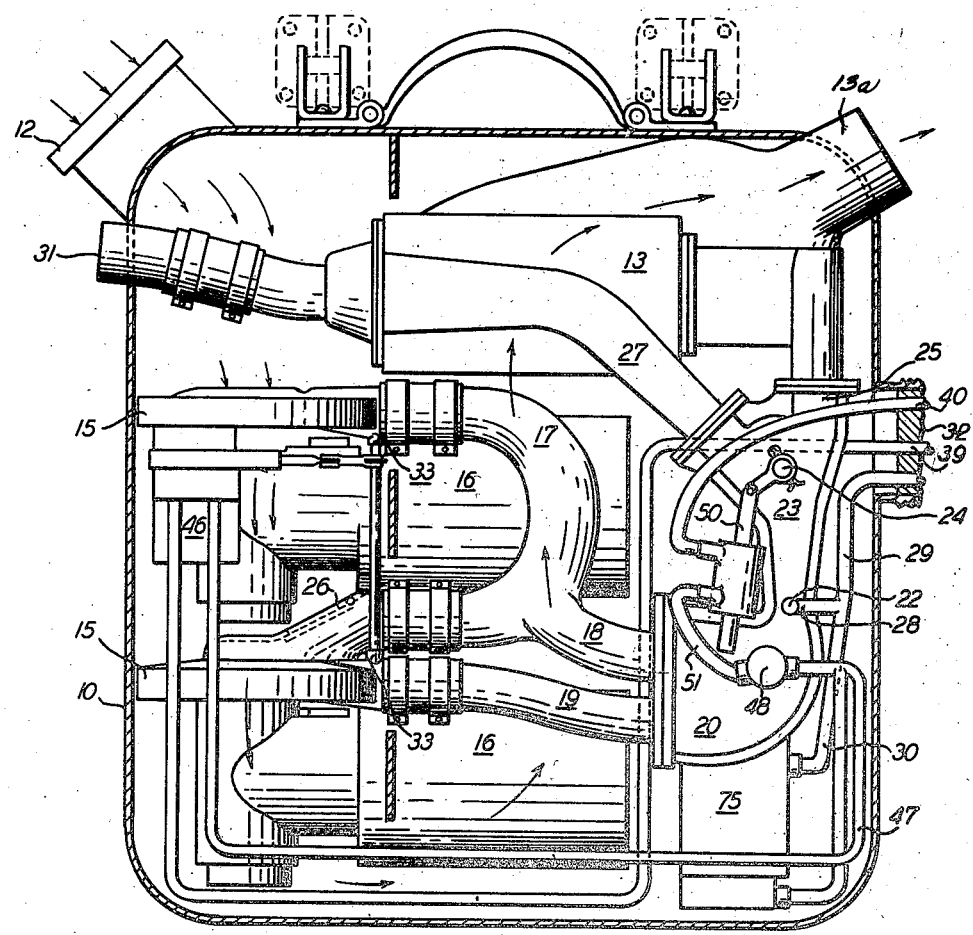
FIG—IV
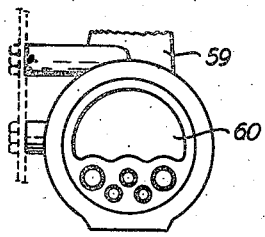
FIG—IX
INVENTOR
NATHAN C. PRICE

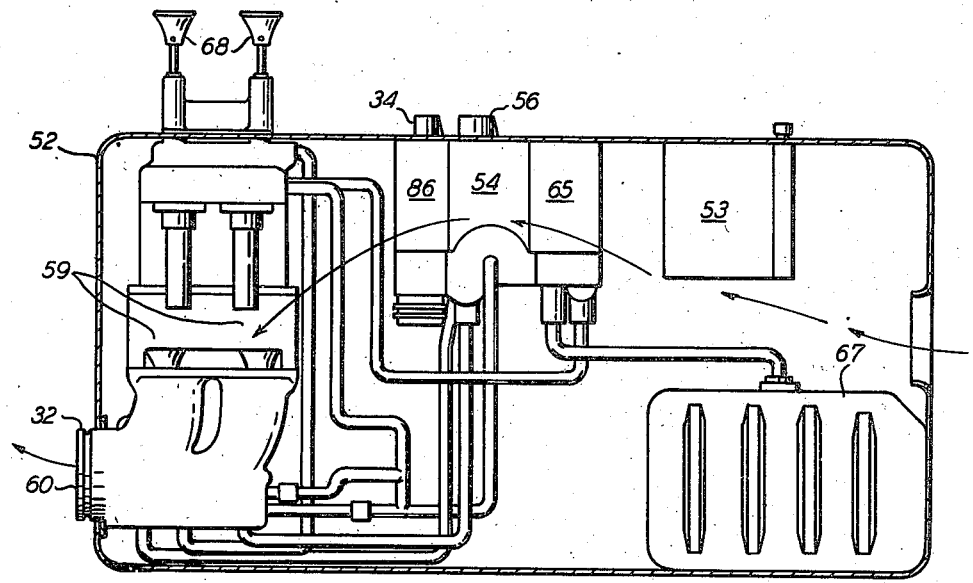
FIG-V
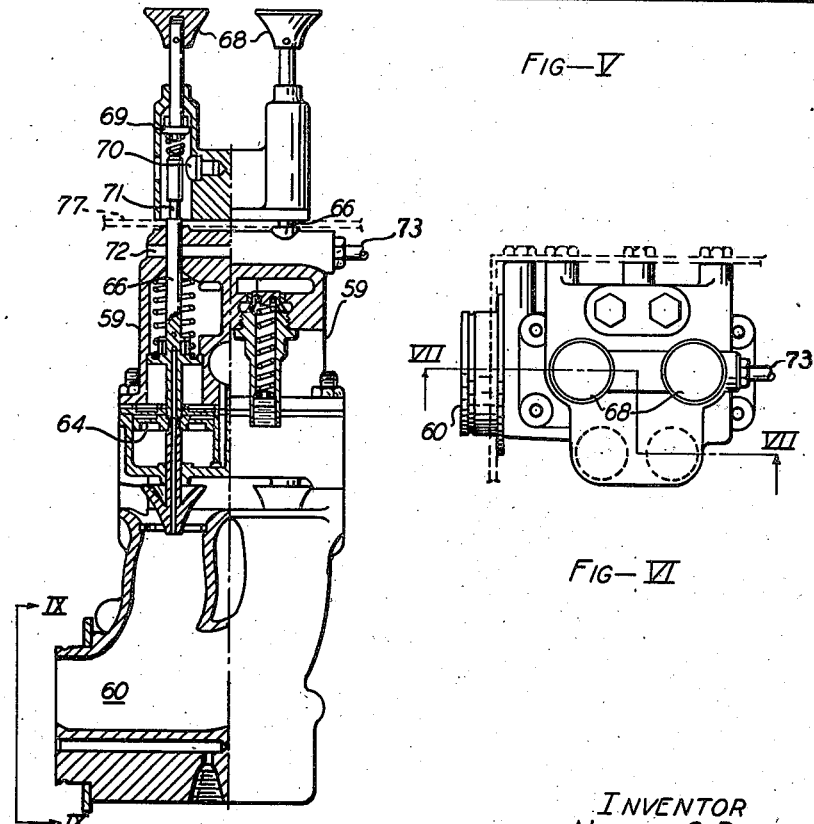
FIG-VII
FIG-VI
INVENTOR
NATHAN C. PRICE
BY George C. Sullivan Patented Aug. 13, 1946

2,405,670

UNITED STATES PATENT OFFICE 2,405,670

PRESSURIZING EQUIPMENT FOR AIRCRAFT

Nathan C. Price, Hollywood, Calif., assignor to Lockheed Aircraft Corporation, Burbank, Calif.

Application August 17, 1942, Serial No. 455,023

11 Claims. (Cl. 98—1.5)

This invention relates to improved and simplified pressurizing equipment for airplanes intended to operate at high altitudes, such, for example, as single or two compartment pursuits and intercepters, or for turrets and other isolated compartments of a large airplane, such as a bomber.

The invention also relates to methods of providing improved and simplified temperature control of the pressurized space by biasing the action of pressurizing equipment components in a novel manner. Such action alters supply air temperature, as needed for comfort, without interfering with normal pressure control functions, thereby obviating the necessity of providing in the airplane certain complicated and bulky apparatus otherwise required for the purpose of heating or cooling pressurized compartment air.

Pressurized cabins for high altitude flight in large airplanes have been heretofore proposed; and in my prior application, Serial Number 343,274, filed June 29, 1940, now Patent #2,342,220, I have disclosed such a system wherein engine driven superchargers or air compressors deliver a large volume of air to the passenger and crew space, the cabin pressure being controlled by outlet valves substantially independent of the supercharger system, except for the heating of the outlet valves by the incoming air to prevent freezing thereof due to the drop in pressure therethrough. In the present invention I have provided independently mountable and removable pressure and control containers, hereinafter called packs, which together contain all the operating and control mechanism, and are interconnected with each other and suitable air ducts of a very simple type in the airplane by means of multiple plugs, the disconnection of which simultaneously frees a number of electrical connections and pneumatic ducts to permit ready removal of either or both the pressure and control packs. A resulting feature of this arrangement permits the installation of the pressure pack either inside or outside of the pressurized space in the airplane, yet allows proper cooling of the mechanism therein by a rammed air supply, from which the superchargers also draw the air to be compressed. Superchargers, electric motors and minor electrical parts are adequately cooled due to the particular internal arrangement of these components within the pressure pack. Thereby necessity of installing complicated ducting throughout the airplane for cooling and ventilation of these components is entirely avoided. The control pack may be installed to the right or left of the pilot or gunner as desired, either alongside his seat or against the wall of the compartment as conditions may render desirable, each pack being preferably resiliently supported in quickly releasable mountings intended to isolate the packs from the aircraft structure. In a representative case the packs, containing substantially the entire cabin pressurizing and temperature control systems, can be replaced in the airplane by newly serviced packs in a period of about ten minutes. The tactical advantage so afforded, of keeping the airplane always available for action in spite of occasional damage due to shell fragments and the like, is of inestimable advantage in military service.

In my previous application, I have disclosed a pressurizing arrangement for passenger compartments of transport aircraft, wherein the pressure and rate of change of pressure is intended to be controlled by the crew. The present invention is primarily intended for military service, to provide sufficient capacity for one or two men at high altitudes, and involves developments and improvements over my previous application in that the controls, while adjustable, are intended to relieve the pilot of all concern regarding the equipment, permitting him to turn it on or off as desired, and providing an emergency shut off for the outlet valves. A feature of this development resides in such automatic control of the cabin or cockpit as to provide an approximately uniform weight of air inflow within the designed altitude limits, thus automatically providing an adequate supply of fresh air regardless of the attenuation of the ambient air at high altitudes. The embodiment of this invention chosen for illustrative purposes is being utilized in flight at present to maintain a pressure equivalent to that at 10,000 feet when the aircraft is at or below 30,000 feet. At higher operating altitudes the equipment is found capable of maintaining a pressure differenial of approximately six pounds to the square inch over the outside pressure.

A further feature of the present invention lies in an arrangement to load or restrict the outlets of the compressors to cause them to do further work on the air, thus increasing the temperature thereof to further heat the pressurized space. This provision is particularly advantageous during winter at low altitudes of airplane operation when heat of compression as a byproduct of the pressurizing function alone would be entirely inadequate for maintaining cockpit warmth. Such heating effect is however arranged to be automatically overridden in an emergency to whatever extent may be necessary, by the pressurization requirements at high altitudes, since under such conditions even an auxiliary oxygen supply is inadequate to maintain the efficiency and alertness of the crew should the cabin pressure fall off, due to excessive leakage, for example.

A further feature of this invention is embodied in arrangements to divert air from the compressors through a cooling core, subject to the regulation of the aforementioned heat control so that the pressurized compartment will be comfortable during operation at altitude in atmospheric conditions of unusually high temperature, such as are sometimes encountered over desert regions in summer.

In pressurized pursuit airplanes the area of transparency of the enclosure is relatively large, so that solar radiation has a strong effect on the enclosure temperature. Change of direction of flight, varying angle of incidence of the sun's rays, requires that controls for enclosure temperature be rapid in action and free from hunting tendencies, such characteristics being a feature of this invention.

A further feature of this invention resides in an improved emergency control whereby the normal air release mechanism may be shut off in the event of damage to the enclosure, or inadequate pressure therein, such action resulting in a maximum speed setting of the supercharger drive to increase the delivery of the superchargers.

Still another feature of this invention relates to an electrical control of the supercharger operating speed, wherein variations in cabin pressures operate a voltage regulator controlling the output of an engine driven generator, thus controlling the power output to motors driving the superchargers. By so controlling the energy input, instead of the power output of the driving motors an improved and more efficient control is provided, which reduces the parasitic load on the aircraft power-plant.

Other and further important objects of this invention will be apparent from the disclosures in the specification and the accompanying drawings.

This invention in its preferred form is illustrated in the drawings and hereinafter more fully described.

As illustrated in the drawings:

Figure I is a diagrammatic sketch of an airplane cockpit incorporating a pressurizing installation embodying the features of this invention.

Figure II is a diagrammatic showing of the pneumatic conduits and control interconnections between the superchargers and the outlet valves of the pressurizing system.

Figure III is a diagrammatic showing of the wiring connections of the system.

Figure IV is a view of the pressure pack, with its cover removed, incorporating the superchargers, air conduits, and intercooler in a readily removable unit.

Figure V is a view of the control pack, with its cover removed, showing the arrangement of the outlet valves and control units as a readily removable unit separate from the pressure pack.

Figure VI is a top plan view of the twin outlet or outflow valves which control the cabin pressure differential by release of air therefrom.

Figure VII is an elevation of the outlet valves shown partly in section as corresponding to the line VII—VII in Figure VI.

Figure VIII is an enlarged elevation of the combined Venturi and Y conduit which includes check valves on the supercharger connections and which controls the intercooler by-pass.

Figure IX is a side view of the gang connection at the outlet of the outflow valve in the control pack.

As shown, the description of the embodiment of the invention, chosen for illustrative purposes, may conveniently be broken down into units.

The supercharging mechanism, intercooler and flow measuring and controlling arrangements are conveniently grouped as a unit in what may be called the supercharger or pressure pack, comprising a casing or compartment 10 having a sealed, quickly removable cover, the casing forming a plenum chamber supplied with rammed air by means of an air scoop 11 and duct 12, and exhausting a portion of this air through an intercooler 13 for the air supplied to the cockpit 14. An exhaust air outlet duct 13$^a$ is of restricted size compared to the duct 12, in order to maintain a positive pressure in the casing 10. Twin counter-rotating superchargers 15, driven by electric motors 16, draw their air supply from the plenum chamber. Ordinarily the twin superchargers operate in series to minimize the load carried by each thereby reducing required rotative speed. The lower supercharger in Figure IV takes the discharge from the upper one through a duct 17, but either supercharger is capable of carrying the load alone by virtue of provisions for automatically increasing speed thereof in the event of the failure of the other in an emergency, as suitable ducts 18 and 19 lead from the discharge of each compressor to a common Venturi chamber 20. Each duct has a back flow check valve 21 to isolate the inoperative supercharger. When operating in series the air will flow from the plenum chamber into the throat of the upper supercharger and from the discharge thereof to the throat of the lower supercharger to be further compressed therein, and thence from the discharge duct 19 of the latter to the Venturi chamber 20. When the lower supercharger operates alone, a flap valve 26 opens by suction to admit air directly to the throat thereof without appreciable flow resistance, thereby maintaining satisfactory volumetric efficiency.

The Venturi chamber 20 is associated with a flow measuring venturi 22 which discharges into a Y or by-pass valve chamber 23. The valve 24 serves to control air flow through a duct 25 into the intercooler 13 or a by-pass 27 therearound, as cockpit temperature requirements may dictate. The Venturi throat 22 is tapped by a twin pressure connection 28, one branch 29 leading to the cabin outflow valve, to be later described, and the other branch 30 leading to a voltage regulator which controls the speed of the superchargers. The duct 25, extending to the intercooler 13, and the by-pass duct 27 therearound, unite in a supply duct 31 communicating with the interior of the pressurized enclosure or compartment. A quickly detachable gang connection 32 leads to the control pack, to be hereinafter described. The gang connection 32 provides separate pneumatic and electric connections for each control line that leads from the pressure pack to the control pack, all communications therebetween being made or broken by connecting or disconnecting the single gang connection 32 at one operation.

Loading valves 33, automatically adjusted in unison, serve to restrict the outlets of the superchargers when an increased heat supply is required by a temperature control 86 exposed to the air leaving the cockpit or pressurized space from within the control pack which contains the outflow valves. The loading valves 33 decrease the efficiency of the superchargers by throttling and hence increase the heat of compression in the air discharged therefrom as a result of the consequent increased speed response of the superchargers, to the constant air flow control. An automatic emergency overriding control relay connected to a low pressure warning cylinder 42, serves to limit closure of the loading valves if the superchargers fail to maintain the desired pressure in the cockpit or compartment. An increment of about 800 feet of cabin pressure altitude reduction beyond normal cabin pressure is sufficient to cause this emergency control to act.

The temperature control 86 includes an adjusting knob 34 conveniently located on top of the control pack to be described. The knob sets the anchor end of a coiled thermostatic member 37 (Figure II) which in turn adjusts a pilot operated piston valve 38 of the follow-up type controlling pneumatic connections 39 and 40. Connection 39 communicates through the valve and a tube 41 to the air suction available in warning cylinder 42 which responds to the pressure within the cockpit. Inadequate cockpit air pressure results in diminution of the vacuum which normally holds piston 43 in cylinder 42 from engaging electrical contacts, and therefore, piston 43 lights a warning lamp 44 and sounds a horn 45 if the cabin pressure is inadequate. Such action and the reasons therefor have been described in the previously mentioned patent application. This may be the same warning horn which is also used in most airplanes to indicate to the pilot that the landing gear may not have been lowered while approaching the field.

If the cockpit tends to be cold the bimetal 37 urges the piston valve 38 to the left side, in Figure II, admitting servo vacuum from chamber 42 via the connections 41 and 39 to one side of a piston 46, whereby the loading valves are closed to an extent which restores cockpit temperature to normal value. It is apparent, however, that if the cockpit air pressure is inadequate, the servo vacuum referred to will have been diminished as previously stated so that the closure of the loading valves will be prevented or limited.

If the cockpit tends to be too warm the bimetal 37 urges the valve 38 to the right side, admitting servo vacuum from chamber 42 via connections 40 and 49 to one side of a piston 50, whereby valve 24 is rotated to divert supercharger air through the intercooler 13 to such extent as will restore cockpit temperature to normal value.

When cockpit temperature exists at normal temperature, solely by virtue of exactly the correct amount of heat arising from air compression in maintaining predetermined cabin pressure, then neither intercooling nor loading valve action is required and since the free end of bimetal 37 then rests in neutral position at such times, valve 38 is maintained in centered position whereby servo vacuum is prevented from entering the connections 39 and 40. It is obvious that such condition of temperature balance is comparatively infrequent in pressure cabin operation.

One side of the piston 46 is balanced against a pressure connection 47 and tap 48 to the Venturi chamber 20. Similarly one side of the piston 50, which operates the Y valve 24 to by-pass supercharger air about the intercooler 13, is exposed to the pressure within Venturi chamber 20 by a tube 51 leading to the tap 48. The purpose of the latter connections to tap 48 is to increase the available pressure differential which can be caused to act upon the pistons 46 and 50, subject to control of the piston valve 38.

When cabin heat is required the temperature control progressively by-passes the supercharged air supply around the intercooler 13 to supply the full heat of compression to the cockpit, and if this is insufficient to meet the comfort temperature, the loading valves are progressively brought into action to supply further heat providing the superchargers are still capable of maintaining the pressure differential in the cockpit. Failure to maintain the desired pressure results in a pressure differential on the piston 46 which limits the closing tendency of the loading valves in spite of the increased demand for heat.

The various pressure and temperature control devices are mounted in a control pack case 52 which is independent of the pressure pack except for electrical and pneumatic connections therebetween, through the gang fitting 32. The control pack may be mounted in any position relative to the pilot or operator, as the operating switches and knobs are arranged on the front and top and are equally accessible from either side of the case 52. A standard altimeter 53, near the front of the top, indicates cabin pressure conditions in terms of the standard altitude corresponding to the pressure in the cockpit. The thermostat control knob 34 and the temperature control housing 86 are joined to an air relay valve housing 54 which includes an altitude adjustment scale 55 and knob 56. The knob 56 varies the adjustment of a bellows 57 controlling a beam valve 58 which acts to hold the cockpit pressure to any desired standard altitude within the range of the equipment. The operation of the beam valve and the operation of the low cabin pressure alarm mechanism have been described in my previous application, Serial Number 343,274, now Patent No. 2,342,230 heretofore mentioned, and it will suffice herein to indicate that the manual adjustment thereof provides for the desired cockpit pressure up to the limiting differential pressure permitted by design consideration.

The desired pressure in the cockpit or compartment is maintained by a control of the release of air therefrom. To this end twin outflow control valves 59 are provided in a casing, the common outlet 60 of which may be connected at 61 to the aircraft gun compartment for example, to keep the guns therein warm enough to function at the low temperatures encountered at high altitudes. The outlet 60 is formed as a quickly detachable gang connection for the pneumatic and electric connections to the pressure pack previously described.

The outflow valves 59 are operated in substantially the same manner as described in my previous application, in that a motor piston 64 is subject to cockpit pressure therebeneath and thereabove to the vacuum from the beam valve chamber 54 of the cabin pressure altitude control through a second beam valve chamber 78 of a cabin rate of pressure change regulator 65 applied through a spring loaded follow-up piston rod 66 as in my former application. The rate of change regulator serves to modulate the basic cabin controlling pressure by time lag of air escaping in a leak of predetermined size between a capacity tank 67 and the cabin interior. In the present case the rate control may be set for a maximum rate of change of 1,000 feet a minute pressure altitude. There is provided a manual shut off for the outflow valves comprising thumb buttons 68 which, when pushed down force a collar 69 past a ball detent 70 to latch the outlet valves closed. Such action brings a groove 71 on the piston rod 66 in line with a cross passage 72 to bleed cabin air to the tap 28 of the Venturi throat 22 via the tube 29. This tends to offset Venturi suction as sensed through a line 73 beneath a piston 74 which operates a voltage regulator 75, and thus increases the supercharger delivery to compensate for low cockpit pressures such as might be due to excessive leakage therefrom. Thus the emergency manual closure of the outflow valves automatically sets the voltage regulator to increase the supercharger delivery to its maximum.

In further explanation of the supercharger flow control, the setting of the voltage regulator 75 affecting supercharger speed, is accomplished in accordance with pneumatic pressure differential acting upon the piston 74 as a result of flow in the Venturi throat 22. The larger the flow tendency of the air through the throat 22, the greater the differential acting upon the piston 74 to reduce the voltage setting of the regulator 75. Thus a substantially constant flow of air is provided by the superchargers, according to a predetermined setting of the flow control, regardless of airplane altitude or cabin pressure, except when the cabin outflow valves are entirely closed at which time the described bleeding of cabin air into the tap 28 biases the flow control toward an increased flow setting.

The voltage regulator 75 is incorporated in the pressure pack for convenience, whereby its heat of electrical resistance may also be carried away by cooling air, and serves to control the output of an engine driven generator 76 to thereby control the speed of the motors 16 which drive the superchargers.

Referring to the wiring diagram of Figure III, two electric power sources of the airplane are shown, a storage battery 90 and a generator 76 to be driven by an airplane engine. A master switch provides a means of either disconnecting or engaging all the electrical circuits within the supercharging pack and within the control pack to the airplane electrical system. This switch is used by the pilot to bring about functioning of the cabin pressurizing and temperature control system or to shut the system off, and is the only control which the pilot is absolutely required to operate.

An emergency switch is provided whereby electrical engagement can be shifted from "normal" or electric generator derived power to "emergency" or storage battery derived power. The packs may be energized from the latter emergency setting in case the engine driving the generator 76 is damaged and ceases to function.

A low cabin pressure horn release switch is provided to disengage the horn electrically at pilot's choice, for instance, in case the pressurized compartment of the airplane is badly punctured prior to returning from a long distance tactical mission. Under such circumstances the cabin pressurizing system may be capable of maintaining partial and useful pressure in the enclosure, yet the pilot would desire to eliminate the constant sound of the alarm horn during the return flight. The altimeter in the control pack would then serve as a means for the pilot to observe his cockpit pressure altitude whereby any further increase in cabin leakage would become apparent to him.

In the wiring diagram of Figure III the voltage regulator 75 is shown as adjusting a second voltage regulator adjacent to the generator 76. The latter regulator acts as a voltage limiting device at the generator, to eliminate local variations in supply voltage arising at the generating source as a result of change of engine speed. The actual speed control of the superchargers as required by pressure cabin operating conditions is afforded by the action of voltage regulator 75 in adjusting the voltage regulator adjacent to the generator 76.

Air is supplied to the supercharger pack through a duct which connects to a scoop located in the slip stream. A water separator 100 has been incorporated in this duct to prevent the entrance of free moisture into the supercharger pack. It is desirable that the pressure drop in this duct be kept to a minimum in order that a pressure equivalent to one inch of Hg above atmospheric ambient pressure will exist in the pack. Normally the superchargers operate in series, the air entering the upper supercharger where it receives a partial pressure rise and then is delivered to the lower supercharger where it receives the second and final stage of compression.

The ducts leading from the superchargers are fitted with check valves which permit either supercharger to operate singly in the event the other fails. The air passes into a manifold and then through a venturi. This venturi provides the pressure differential for operation of the voltage regulator. The voltage regulator operates to control the setting of the voltage regulator located at the generator. If flow from the superchargers starts to drop, voltage output of the generator is increased, thereby increasing the speed of the variable speed motors driving the superchargers, thus increasing the air flow. From the venturi the air passes into a Y duct, one branch of which will conduct the air to an intercooler, the other branch will by-pass the intercooler. From the intercooler or by-pass the air is then ducted to the exit of the sheet metal enclosure of the pack where it is ready for delivery to the pressurized space. The Y duct incorporates a "butterfly" type damper, which is automatically controlled and directs the air either through the intercooler or the by-pass. The automatic control will be explained later in this description. Supercharger air passes through the intercooler in the direction of the long dimension and the coolant air (ram air) passes through the unit on the opposite side of the plates and in the direction of the short dimension. The intercooler removes a part of the heat of compression, when such heat is not required to heat the pressurized space.

A pneumatically actuated valve, located in the control pack, controls the outflow of air and thus maintains the proper pressure in the pressurized space. Two valves are used, discharging into a common duct, in order that malfunctioning of one valve will not impair the functioning of the entire pressurization system. The regulation of the outflow valve is automatic, depending upon the altitude of the pressurized space and the vertical speed controls for amount of operation. Each valve consists essentially of the valve poppet, a motor or motivating piston, and a pilot or positioning piston. A small spring loaded valve opening into the chamber above the pilot piston is vented to the atmosphere and is adjusted so that the maximum differential between the pressurized space and the atmosphere can not exceed a predetermined amount. If there is a tendency for this differential pressure to be exceeded, the valve opens, thus causing a low pressure on the top of the pilot piston; thereby causing the outflow valve to open and lower the pressure in the pressurized space. Provisions have been made for manually closing the two outflow valves in case it becomes necessary to increase pressure rapidly. A small groove cut in the upper end of the stem permits air from the pressurized space to flow into the low pressure side of the voltage regulator diaphragm, when both outflow valves are completely closed. This allows the regulator to increase the voltage being supplied to the supercharger drive motors, thereby increasing the flow of air into the pressurized space.

Altitude or absolute pressure control of the pressurized space is accomplished through the control panel unit, which is located in the control pack. An absolute pressure selector knob is provided. The setting of this knob determines the position at which the outflow valve will operate by increasing or decreasing the amount of vacuum available for its operation.

Automatic temperature control is incorporated in the pressurization equipment. Heat of compression is utilized for heating the pressurized space. The automatic control functions to increase the amount of heat by causing the superchargers to operate less efficiently or to decrease the amount of heat by improving the efficiency of the superchargers to their maximum and, if still less heat is required, by passing the compressed air through an intercooler. Manual adjustment of the automatic temperature control to the desired temperature setting is provided by a knob located on the control panel. Turning of this knob adjusts a bimetal coil, one end of which is connected to a pilot valve operating inside a dual spool type positioning valve. This positioning or spool valve controls vacuum from two sources: (1) A direct connection is made to the main vacuum system in the control panel to operate a piston which moves the butterfly valve located in the Y duct on the discharge of the supercharger which directs the air from the superchargers either through the intercooler or through the duct which by-passes the intercooler; (2) another connection is made to the low pressure indicator vacuum circuit in the control panel to move another piston which operates the supercharger loading valves. The two loading valves are linked together so that they operate simultaneously and are spring loaded in the open position. The restriction caused in the discharge ducts of the superchargers by the closing of these valves causes the superchargers to operate less efficiently, thus converting more mechanical energy into heat in the air being supplied to the pressurized space. This is because flow control steps up the speed and input electrical load of superchargers.

The low pressure indicator vacuum circuit has been utilized as a source of vacuum for operation of the two loading valves in order that any tendency for cabin pressure to drop, due to the restriction being caused by closure of the loading valves may be immediately compensated for by spoiling of the vacuum in the emergency circuit, thereby allowing the loading valves to return to a position at which the pressure is maintained satisfactorily.

A capacity tank located in the control unit is connected into the vertical speed control to govern the rate of change of pressure during climb or descent.

It will thus be seen that I have invented an improved pressurizing equipment for airplanes, wherein the normal operation thereof will be entirely automatic, with overriding manual and automatic controls operable under emergency conditions such as excessive leakage from the pressurized compartment. It will be apparent to those skilled in the subject art that pressurizing and temperature regulation components have been provided to meet more varied operational contingencies as compared to equipment of the past. Such of the components as have been provided in airplanes previously have been widely distributed in different parts of the fuselage, wings, and nacelles, with attendant complication from the standpoint of manufacture, servicing, and reliability, and with greater difficulty of obtaining satisfactory performance due to existence of long ducts, wires and control leads. The arrangements afforded by my invention result in simplification of the pressurizing and temperature control apparatus when taken as a whole, in spite of the fact that the functional scope of this class of equipment has been widened to provide greater comfort and more adequate protection to flight personnel. The packs are very compact, rendering installation in new aircraft an easy matter and the total weight of the aforesaid apparatus is only about eighty (80) pounds in a representative case.

Having thus described my invention and the present preferred embodiments thereof, I desire to emphasize the fact that many modifications may be resorted to in a manner limited only by a just interpretation of the following claims.

I claim as my invention:

1. In an airplane compartment pressurizing apparatus, a removable closed unit forming a plenum chamber and having a rammed air supply connection thereto and a restricted outlet therefrom, at least one supercharger in said plenum chamber having its intake open to said chamber and drawing its air therefrom, a flow measuring Venturi pipe connected to the supercharger outlet, an intercooler in said chamber connected between said venturi and an outlet to the airplane compartment, said intercooler being cooled by the air flow through the outlet from said plenum chamber, a by-pass passage connecting said Venturi pipe to the outlet to said airplane compartment, valved means governing the air flow through said intercooler and by-pass passage whereby to vary the heat carried by the air supplied to the airplane compartment, and loading means in said supercharger outlet so constructed and arranged as to increase the work done on the air and thereby increase the heat of compression in the air supplied to said airplane compartment.

2. In a compartment pressurizing apparatus, a pair of superchargers, variable speed electric motors for driving the same, a power source therefor, a flow measuring Venturi pipe, ducts interconnecting said superchargers and Venturi pipe, valving means in said ducts arranged for both series and independent operation of said superchargers, an intercooler and a by-pass in parallel therewith to selectively receive the flow from said Venturi pipe and to deliver said flow to the compartment to be pressurized, an outlet valve from said compartment, a voltage regulator associated with the power source and the motors for controlling the speed of the driving motors, and a pneumatic control apparatus integratingly responsive to compartment and Venturi pipe pressures for controlling said voltage regulator and outlet valve, said pneumatic control apparatus being so constructed and arranged as to balance the Venturi pressure differential against the compartment pressure to control the voltage regulator whereby to maintain a substantially constant delivery of air to said compartment while controlling the pressure therein.

3. In a compartment pressurizing apparatus, a pair of superchargers, variable speed electric motors for driving the same, a power source therefor, a flow measuring Venturi pipe, ducts interconnecting said superchargers and Venturi pipe, valved means in said ducts arranged for both series and independent operation of said superchargers, an intercooler and a by-pass in parallel therewith to selectively receive the flow from said Venturi pipe and to deliver said flow to the compartment to be pressurized, pressure responsive means controlling the speed of the driving motors, and a pneumatic control apparatus integratingly responsive to compartment and Venturi pipe pressures for controlling said pressure responsive means, said pneumatic control apparatus being so constructed and arranged as to balance the Venturi pressure differential against the compartment pressure to control the pressure responsive means whereby to maintain a substantially constant delivery of air to said compartment while controlling the pressure therein.

4. In a compartment pressurizing apparatus, a pair of superchargers, variable speed electric motors for driving the same, a power source therefor, a flow measuring Venturi pipe, ducts interconnecting said superchargers and Venturi pipe, valved means in said ducts arranged for both series and independent operation of said superchargers, an intercooler and a by-pass in parallel therewith to selectively receive the flow from said Venturi pipe and to deliver said flow to the compartment to be pressurized, a voltage regulator controlling the speed of the driving motors and a pneumatic control apparatus responsive to Venturi pipe pressures for controlling said voltage regulator, whereby said pneumatic control apparatus is adapted to maintain a substantially constant delivery of air to said compartment.

5. In a compartment pressurizing apparatus, a pair of superchargers, variable speed electric motors for driving the same, a power source therefor, a flow measuring Venturi pipe, ducts interconnecting said superchargers and Venturi pipe, valved means in said ducts arranged for both series and independent operation of said superchargers, said Venturi pipe discharging into the compartment to be pressurized, a voltage regulator controlling the speed of the driving motors and a pneumatic control apparatus integratingly responsive to compartment and Venturi pipe pressures for controlling said voltage regulator, whereby said pneumatic control apparatus is adapted to maintain a substantially constant delivery of air to said compartment while controlling the pressure therein.

6. In a compartment pressurizing apparatus, a pair of superchargers, variable speed electric motors for driving the same, a source of power therefor, a flow measuring Venturi pipe, ducts interconnecting said superchargers and Venturi pipe, valved means in said ducts arranged for both series and independent operation of said superchargers, an intercooler and a by-pass in parallel therewith to selectively receive the flow from said Venturi pipe and to deliver said flow to the compartment to be pressurized, loading valves in said ducts, compartment temperature responsive means for selectively controlling said loading valves, an outlet valve from said compartment, differential pressure responsive means connected to said Venturi pipe for controlling the speed of the driving motors, and a pneumatic control apparatus integratingly responsive to compartment and Venturi pressures for controlling said pressure responsive means and outlet valve, whereby said pneumatic control apparatus is adapted to maintain a substantially constant delivery of air to said compartment while controlling the pressure therein.

7. In a compartment pressurizing system of the type described, a pair of superchargers, variable speed electric motors separately driving the same, a source of power therefor, a flow measuring Venturi pipe, ducts and check valves associated therewith arranged for both series and independent operation of said superchargers, a voltage regulator for controlling the speed of said motors, a pneumatic operating mechanism associated with said voltage regulator, and connections from said mechanism to said Venturi pipe, whereby to maintain a substantially constant air flow therethrough whether the superchargers are operating singly or in series.

8. In a compartment pressurizing system of the type described, a pair of superchargers, variable speed electric motors separately driving the same, a flow measuring Venturi pipe, ducts and check valves associated therewith arranged for both series and independent operation of said superchargers, a main source of power, a voltage regulator therefor for controlling the speed of said motors, a pneumatic operating mechanism associated with said voltage regulator, connections from said mechanism to said Venturi pipe whereby to maintain a substantially constant air flow therethrough whether the superchargers are operating singly or in series, an auxiliary source of power for said motors, and means associated with said operating mechanism to transfer the motor drive to said auxiliary source of power in an emergency.

9. In a compartment pressurizing system of the type described, a pair of superchargers, variable speed electric motors separately driving the same, a flow measuring Venturi pipe, ducts and check valves associated therewith arranged for both series and independent operation of said superchargers, a voltage regulator for controlling the speed of said motors, an engine driven generator forming a source of power, said voltage regulator being so constructed and arranged as to vary the generator voltage to control the speed of the supercharger motors, a pneumatic operating mechanism associated with said voltage regulator, and connections from said mechanism to said Venturi pipe for energizing said pneumatic operating mechanism whereby to maintain a substantially constant air flow therethrough whether the superchargers are operating singly or in series.

10. In an airplane compartment pressurizing apparatus, a removable closed unit forming a plenum chamber and having a rammed air supply connection thereto and a restricted outlet therefrom, at least one supercharger in said plenum chamber having its intake open to said chamber and drawing its air therefrom, a flow measuring Venturi pipe connected to the supercharger outlet, an intercooler in said chamber connected between said Venturi pipe and an outlet to the airplane compartment, said intercooler being cooled by the air flow through the outlet from said plenum chamber, a by-pass passage connecting said Venturi pipe to the outlet to said airplane compartment, and valved means governing the air flow through said intercooler and by-pass passage whereby to vary the heat carried by the air supplied to the airplane compartment.

11. The method of conditioning the supply of air to maintain a positive pressure in a closed compartment comprising normally operating a pair of motor driven air compressors in series, controlling the operating speeds of the driving motors in response to air flow from said compressors to maintain a substantially constant volume of compressed air even upon failure of one of said compressors, controlling the positive pressure in said compartment by releasing varying quantities of air therefrom, loading the compressors to increase the work done on the air therein during compression when an additional heat supply is required in said compartment, and overriding said loading means in response to pressure in the compartment to maintain positive pressure within said compartment.

NATHAN C. PRICE.